United States Patent [19]

Perdue

[11] 4,333,091

[45] Jun. 1, 1982

[54] COMMAND BUFFERS FOR ELECTRONIC CODE KEYER

[75] Inventor: Terry A. Perdue, St. Joseph, Mich.

[73] Assignee: Zenith Radio Corporation, Glenview, Ill.

[21] Appl. No.: 255,013

[22] Filed: Apr. 17, 1981

[51] Int. Cl.³ ............... G06F 3/02; H04L 13/08; H03R 13/00

[52] U.S. Cl. ............... 340/365 S; 178/17.5; 178/79

[58] Field of Search ............... 178/17 R, 17 C, 17.5, 178/79, 82 R, 82 A; 179/90 B, 90 BB, 90 BD, 90 L; 340/365 R, 365 S, 365 E, 345; 364/709

[56] References Cited

U.S. PATENT DOCUMENTS 3,564,139 2/1971 Bodenstein et al.
3,895,185 7/1975 Ramsey.
4,179,748 12/1979 Brown et al. ............... 340/365 S

OTHER PUBLICATIONS

Advanced Electronic Applications, Inc.

Mostek Single-Chip Microcomputer MK3870.
SYNERTEK CMOS 256×4 Static Random Access Memory.

Primary Examiner—Thomas A. Robinson
Attorney, Agent, or Firm—Jack Kail; John Coult

[57] ABSTRACT

A system is disclosed for utilizing command buffers in a microprocessor controlled electronic code keyer for storing, rather than text to be transmitted, command strings for keyer operation. The command string is defined by a series of keypad closures for selecting a sequence of text buffers to be transmitted. In addition, the command buffers may be used during automatic text transmission to selectively change keyer parameters such as the speed of character transmission, inter-character and inter-word spacing, dot-to-dash-to-space ratio, or the number of times the contents of a text buffer will be automatically repeated. The use of text and command buffers permits the formation of essentially errorless Morse code transmissions, substantially enhances keyer operating and makes more efficient use of available memory.

11 Claims, 7 Drawing Figures

COMMAND BUFFERS FOR ELECTRONIC CODE KEYER

Included in the instant application is a microfiche appendix which is the computer listing for the program stored in the read only memory (ROM) of the microprocessor. Incorporated in this program assembly listing, which is represented in Appendix A comprising two microfiche sheets containing a total of sixty-one frames, is such information as memory addresses, object code, statement numbers and additional source statement information.

BACKGROUND OF THE INVENTION

This invention relates generally to electronic code keyers, and particularly relates to an improved electronic code keyer with completely automatic operation provided by a microprocessor.

Ever since the first code keyer was developed, the operator's goal has been to produce errorless text transmissions at high speed. But with more than 50 different characters typically involved in a standard message and with each character comprised of up to six bits of information in the form of dots and dashes, the memory and manual dexterity of even the most skilled keyer operator has been put to the test. During this period various approaches for minimizing operator error while simultaneously increasing message transmission speed have been attempted.

One approach to improving keyer operator efficiency is disclosed in U.S. Pat. No. 3,895,185 to Ramsey which makes use of a modified ring counter circuit for converting Morse or similar code signals to characters and storing them so that they can be read on a display panel as desired. This system utilizes a three position switch for the generation of dots and dashes in combination with individual character indicator lamps arranged in what is described as an inverted three configuration on a front panel which permits the character generated by virtue of the operator produced dots and dashes to be observed by the operator. The inverted tree-counter configuration includes a read only memory (ROM), or a diode matrix, which converts a serial asynchronous telegraphic-type code to a serial synchronous and parallel code for communication functions permitting the use of conventional multi-character printers or displays. The basic storage or latching circuits for the tree counter system provide for storage by locking on to the character required and turning on a series circuit indicator light in an individual anode circuit. The system therefore not only permits the character generated to be visually displayed but also provides for the temporary storage of generated characters which may be later transmitted. This store and transmit feature permits the operator to generate characters independent of the individual operating speed of the user. U.S. Pat. No. 3,564,139 to Bodenstein et al provides an arrangement for the very rapid consecutive operation of a two key impulse transmitter such as a telegraph transmitter without the introduction of any errors due to the closeness in time with which the keys are actuated. This system allegedly eliminates problems arising from the possible formation of so-called mixed symbols which generally are caused by erroneous impulse combinations due to the operation of two operating keys in rapid succession by apparently eliminating the possibility of such double key operations. Bodenstein employs storage means into which the impulses having a duration between two and three microseconds are transferred, with circuit means provided to terminate or transfer these impulses after a period of less than one or two microseconds. By thus shortening inpulse duration the possibility of simultaneous pulse overlap is apparently substantially reduced thereby precluding erroneous character entries caused by simultaneous double key operation.

A more recent advance in the art of electronic code keyers is embodied in a keyer produced by Advanced Electronic Applications, Inc. of Lynnwood, Wash. This keyer makes use o9f a random access memory in the form of an integrated circuit having the capacity to store 4,096 bits which is the approximate equivalent of 500 Morse code characters. Keyer entries are provided to a pair of coupled microprocessors which generate a sequence of characters based upon the coded inputs for storage in and recall from the random access memory. Thus, message text strings may be provided to and stored in a memory at essentially any desired coded impulse input rate and read out of memory and transmitted at a desired word output rate. This arrangement makes the transmission rate essentially independent of the operator's coded impulse input rate. This system, however, suffers from the limitation in that changes in keyer output mode of operation such as the rate at which words are transmitted, the inter-character or inter-word spacing, etc., can be changed only by means of manual inputs following the transmission of each individual message. Therefore, this system, while providing for a high degree of errorless message transmission, is of limited flexibility when a number of messages having a large variety of format parameters is required.

The present invention is intended to avoid the aforementioned electronic code keyer performance limitations by providing a keyer arrangement which permits the user to transmit coded message information over a very large word per minute rate range which is totally independent of the rate at which the operator provides the coded inputs. In addition, stored command strings permit sequential automatic operation of the keyer over a large range of message format parameters.

OBJECTS OF THE INVENTION

Accordingly, it is an object of the present invention to provide an improved electronic code keyer.

Another object of the present invention is to provide a microprocessor controlled electronic code keyer.

It is another object of the present invention to provide a microprocessor controlled electronic code keyer capable of generating essentially perfectly formed character strings in various automatically selected keyer modes of operation.

Still another object of the present invention is to provide a means for automatically controlling the operating parameters of an electronic code keyer.

A still further object of the present invention is to provide an improved electronic code keyer in which both message content and keyer operating parameters may be automatically controlled by the operator.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENTS

Figure 1:
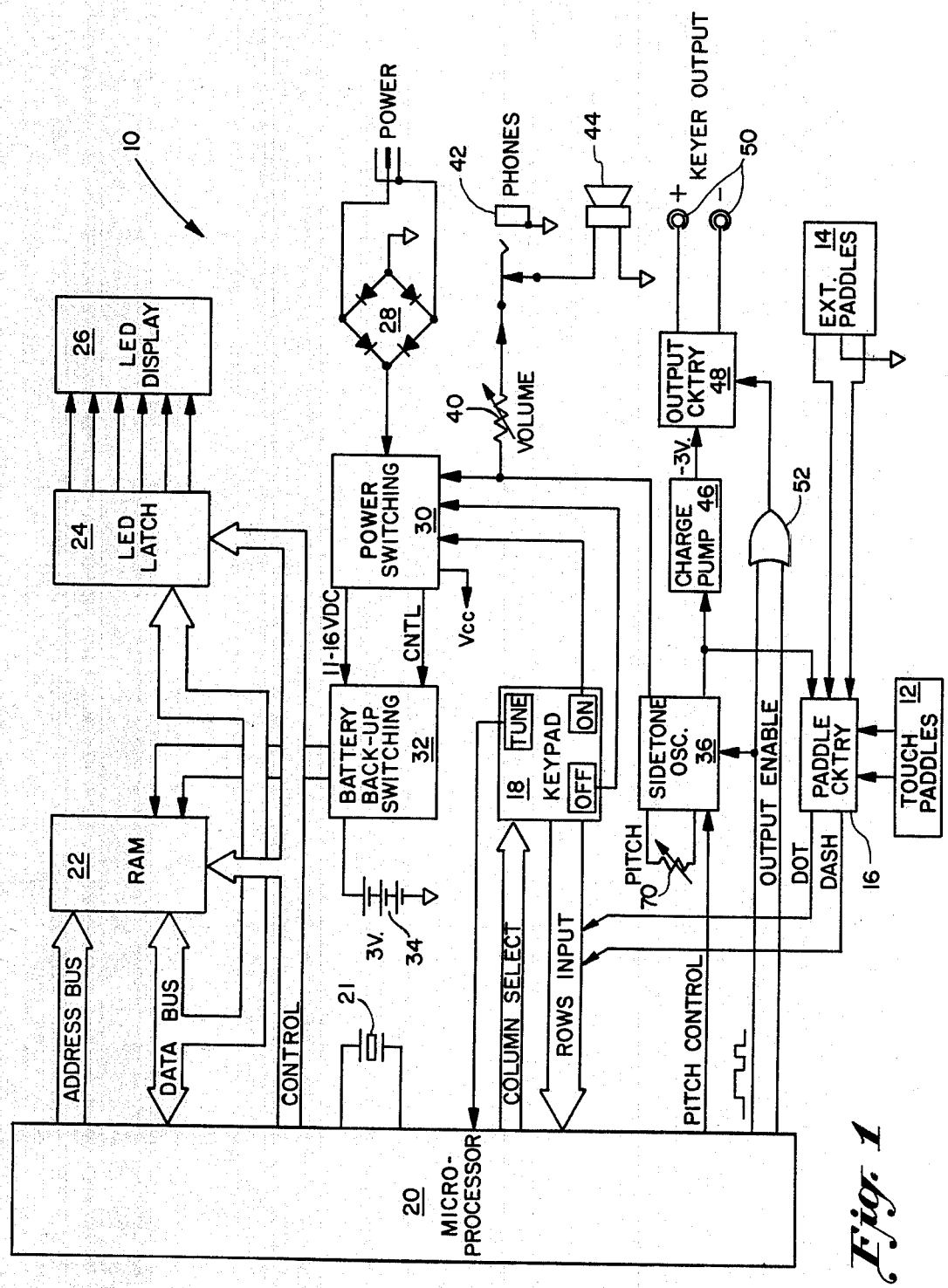
FIG. 1 shows a simplified block diagram of a microprocessor controlled electronic code keyer in accordance with the present invention.

Referring to FIG. 1, there is shown a simplified block diagram of an electronic code keyer 10 in accordance with a preferred embodiment of the present invention. Paddle circuitry 16 is driven by the output signals of either touch paddles 12 or external paddles 14. The output of paddle circuitry 16 is a series of dot and dash request signals which represent in combination the various alpha-numeric characters. These dot and dash request signals are provided to microprocessor 20 which converts these coded signals to a given alpha-numeric character. Keypad 18 provides microprocessor 20 with any of a number of desired mode of operation commands for operating keyer 10. Touch paddles 12, external paddles 14 and keypad 18 are all user operated. Microprocessor 20 is coupled to random access memory (RAM) 22 and is capable of accessing the various addressable memory locations in RAM 22, providing commands and data thereto and reading out the stored data and instructions from RAM 22 in controlling keyer 10 and providing the desired output signals therefrom.

Microprocessor 20 also provides control for light emitting diode (LED) latch 24 which, in turn, drives LED display 26 in providing the user with a visual indication of keyer operating mode. Keyer 10 is energized by a conventional AC power source and includes a rectifying bridge 28 for providing a direct voltage supply to the various components of keyer 10. Power switching circuitry 30 is controlled by keypad 18, energized by rectifying bridge 28 and delivers an output voltage $V_{cc}$ to various keyer components. Power switching circuit 30 also provides power and control to battery back-up switching circuit 32 which provides an alternate source of direct voltage in the form of a 3 VDC battery 34 to the volatile memory of RAM 22. This avoids the loss of RAM contents when keyer 10 is not connected to a conventional AC source.

Sidetone oscillator 36 is driven by microprocessor 20 and provides an audio tone output, the pitch of which is manually variable by means of control 70. The sidetone output of oscillator 36 is provided to variable volume control 40 and then switchably to either headphones 42 or speaker 44. The oscillator output is also provided to charge-pump 46 and thence to output circuitry 48 in energizing keyer output connector 50 for transmitting the coded signal. OR gate 52 allows microprocessor 20 to determine whether an output enable signal from microprocessor 20 will key output circuitry 40 or just sidetone oscillator 36 in generating a sidetone.

Figure 2A:
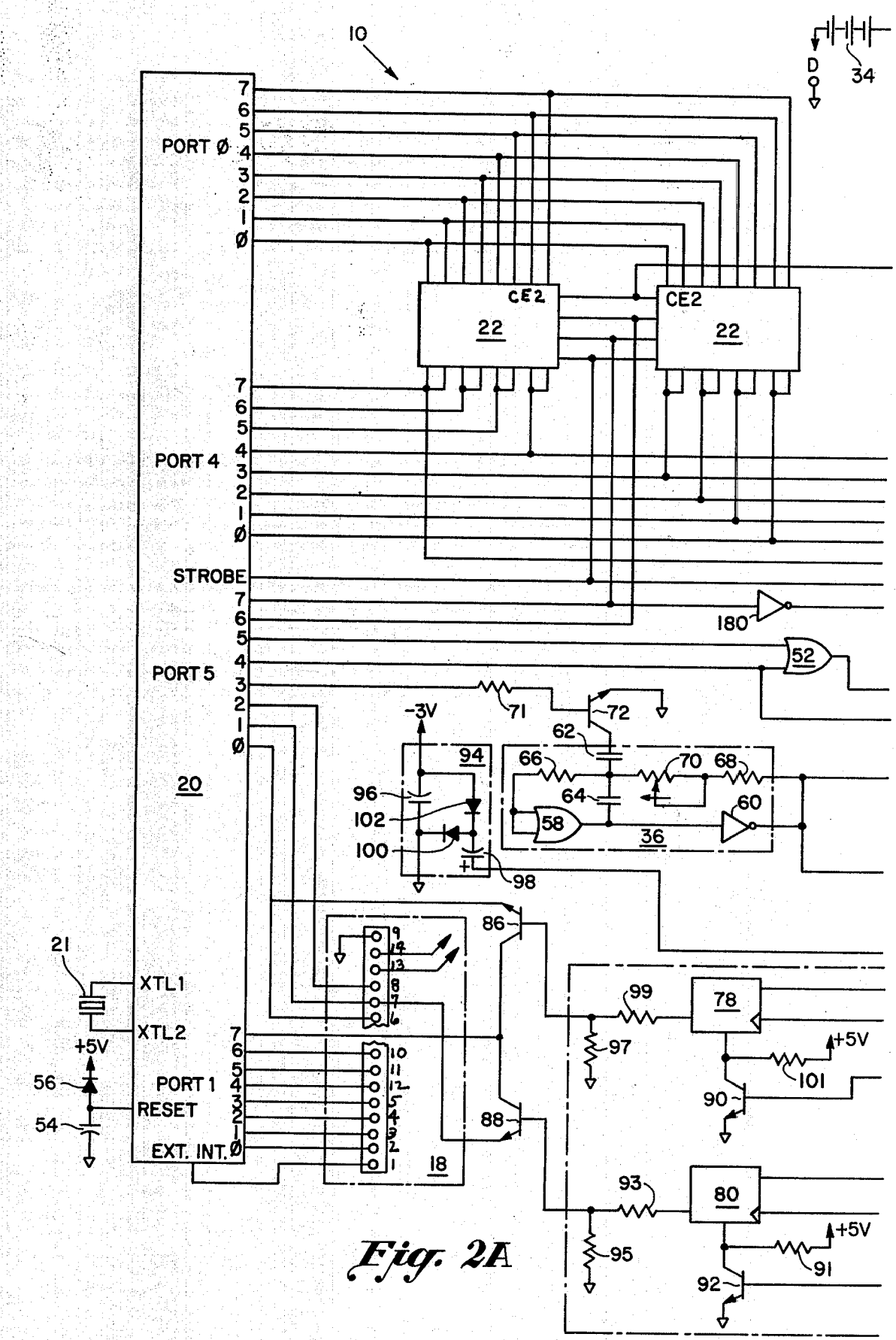
FIGS. 2A and 2B which are partially in block diagram form and partially in schematic diagram form show a microprocessor controlled electronic code keyer in accordance with a preferred embodiment of the present invention.
Figure 2B:
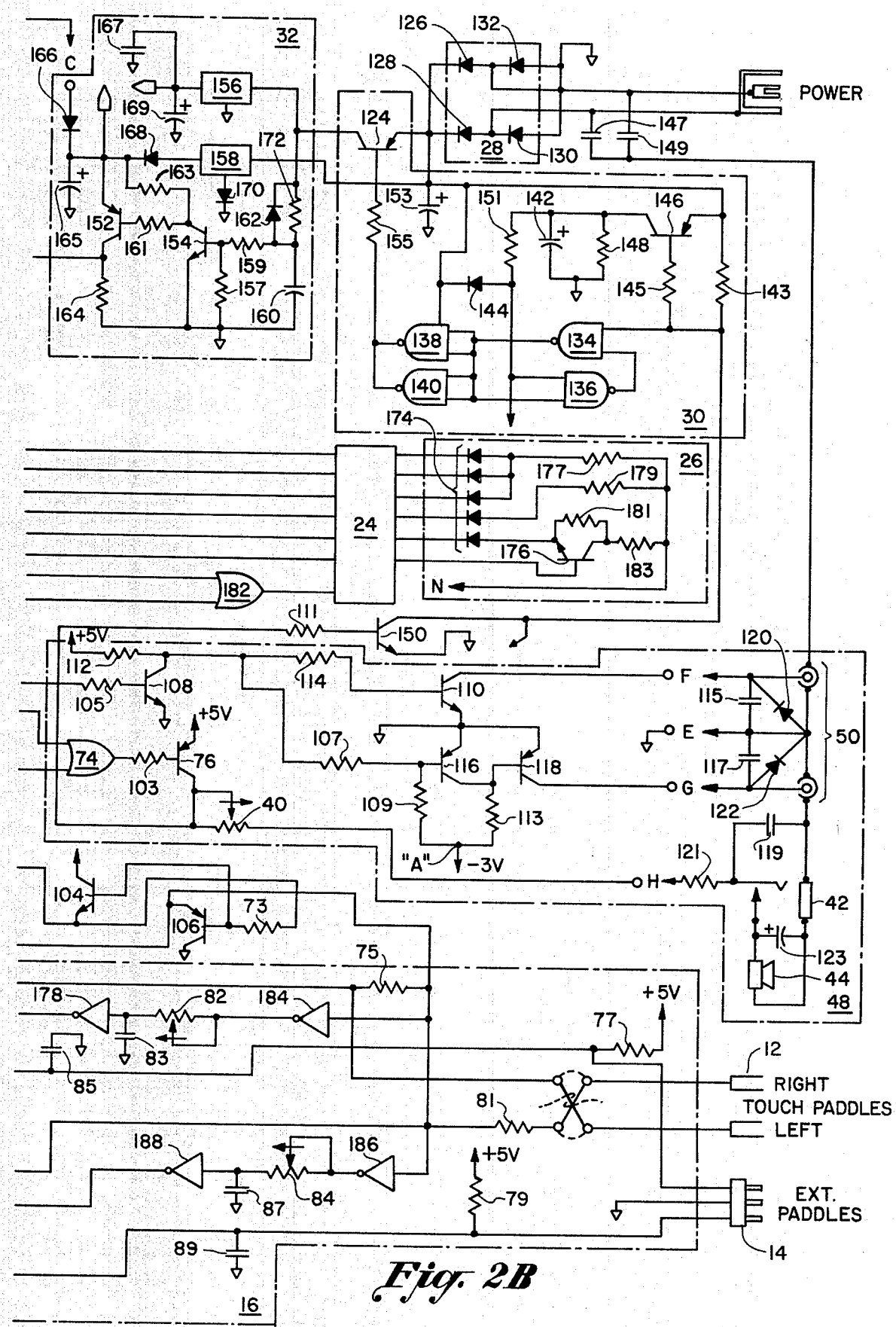

FIG. 2A and 2B show in greater detail an electronic keyer 10 in accordance with the present invention. The microprocessor 20 utilized in the preferred embodiment of the present invention is the 3870 microprocessor which is an 8-bit microprocessor in a single MOS integrated circuit. Microprocessor 20 features 2048 bytes of ROM, 64 bytes of scratch pad RAM, a programmable binary timer, 32 bits of I/O, and a single +5 volt power supply requirement. The 3870 provides four complete bi-directional Input/Output ports. These are ports 0, 1, 4 and 5. An output ready STROBE is associated with port 4. This flag may be used to signal a peripheral device that the 3870 has just completed an output of new data to port 4. The strobe provides a single low pulse shortly after the output operation is completely finished, so either edge may be used to signal the peripheral. A RESET input may be used to externally reset the 3870. When pulled low, the 3870 will reset, when then allowed to go high, the 3870 will begin program execution at program location 000. RESET is accomplished by means of capacitor 54 and an internal pull-up resistor which provide a power-on reset to microprocessor 20. Diode 56 allows capacitor 54 to discharge quickly when the keyer is turned off. EXT INT is the external interrupt input which is merely used as another input pin in the present application. XTL 1 and XTL 2 are the timed based inputs to which a crystal (1-4 MHz) 21, LC network, RC network or an external single-phase clock may be connected. In the preferred embodiment of the present invention a 3.58 MHz output of crystal oscillator 21 is divided internally to provide a 500 microsecond basic timing interval. This interval is then used an appropriate number of times to form dots, dashes and inter-element, inter-character, and inter-word spaces, depending on the speed, spacing and weight for which electronic code keyer 10 is set from control keypad 18. The 3870 used in the preferred embodiment of the present invention is produced by Mostek Corporation of Carrollton, Tex.

Microprocessor 20 services keypad 18, touch paddles 12 and external paddles 14, determines basic keyer timing, keys sidetone generator/oscillator 36 and output circuitry 48, stores and retrieves data from external RAM 22, and updates the status LEDs 26. Port 0 of microprocessor 20 is used as an address bus for external RAM 22 which is comprised of two coupled 256 word by 4 bit CMOS static random access memory integrated circuits. RAM 22 is of conventional design and construction and in the preferred embodiment of the present invention a 5101 CMOS 256×4 static random access memory chip available from Synertek of Santa Clara, Calif. is used. RAM 22 is used as a command and message buffer memory, and also stores the last-set keyer parameters. Microprocessor 20 includes a 2048×8 ROM main memory which incorporates the microprocessor program and data constants stored in program ROM. This program converts the dots and dashes provided to microprocessor 20 by means of either touch paddles 12 or external paddles 14 into the appropriate characters and also provides for the storage of character and command entries in the appropriate memory locations in RAM 22. Port 4 of microprocessor 20 is used as a data bus for external RAM 22 and for LED latch circuitry 24. This port has a STROBE pin which is used to clock data into either RAM 22 or LED latch 24, whichever is enabled, when data output to this port.

Port 5 of microprocessor 20 is a multi-purpose output port. It selects either RAM 22 or LED latch 24 for a WRITE operation, or enables RAM 22 for a READ operation using bits 6 and 8. Port 5 also gates the sidetone output of oscillator circuit 36 to speaker 44 using bit 4, and determines whether the keyer output will be keyed with the sidetone using bit 5. It also lowers sidetone pitch when appropriate using bit 3 and scans the 3 columns of keypad 18 using bits 0, 1 and 2. Port 1 is used to input the key pattern of the selected column from keypad 18. Internal pull-ups cause all inputs to be held high until a key is pressed. When a key is pressed in the selected column of keypad 18, the low level on the column line is passed through switch contacts to the associated bit in port 1. The key is recognized by microprocessor 20 in accordance with the program stored in its ROM (not shown), and the appropriate action taken. The dot and dash paddles 12 and 14 are effectively part of the keypad matrix 18 in that they are a second source of input signals thereto, but are handled differently by microprocessor 20. The TUNE key is not part of the keypad matrix in that it is connected to the external interrupt (EXT INT) pin on microprocessor 20, which is used as an auxiliary input. The TUNE key is active only when the keyer is in NORMAL or PAUSED modes, and only when keyer 10 has transmitted the last character generated. Keyer 10 is then latched in the TUNE mode until a second key is pressed (or a paddle is touched), at which time the TUNE mode is unlatched following which the second key performs its normal function for the current mode of the keyer.

OR gate 58, inverter 60, capacitors 62 and 64 and resistors 66 and 68 form an astable oscillator 36. Astable oscillator 36 runs continuously while keyer 10 is turned on. Its frequency of oscillation is manually adjustable by means of control 70 and may be lowered by microprocessor 20 by the turning on of transistor 72 which effectively parallels capacitors 62 and 64. The output of oscillator 36 is gated through OR gate 74 by microprocessor 20 and drives speaker 44 through transistor 76.

The output of astable oscillator 36 also drives the D input and clock input of flip-flops 78 and 80 after being buffered by transistor 104 and 106. The signal is delayed to the clock inputs by adjustment means 82 and 84. When the timing delays to flip-flops 78 and 80 are properly set, the D input will go high just in time for the rising edge of the clock input to SET flip-flops 78 and 80. When a paddle on touch paddles 12 is touched, the capacitance added by the operator's body delays the D input to these flip-flops enough that it is still low when the clock input goes high, resulting in the resetting of the associated flip-flop. This results in the respective turn-on of either transistor 86 or transistor 88, which each act as a closed switch in the matrix. When external paddles 14 are used, transistor 90 or transistor 92 is turned off by a paddle closure, also resulting in the resetting of the associated flip-flop and producing the same results. A charge-pump circuit 94 comprised of capacitors 96 and 98 and diodes 100 and 102 provides a negative potential to keyer output circuitry 48 at point "A". Transistors 104 and 106 buffer the oscillator output to paddle circuitry 16 to avoid "chirp".

OR gate 52 permits microprocessor 20 by means of its output on port 5, bit 4 to key either output circuitry 48 and the sidetone from oscillator 36, or just the sidetone output of oscillator 36. If OR gate 52 is enabled, its output goes low on each dot and dash turning off transistor 108. This allows transistor 110 to be turned on by resistors 112 and 114 and to key a positive key line to neutral ground potential. At the same time the base of transistor 116 will proceed to near 0 volts, resulting in its turn off and allowing transistor 118 to key a negative key line to neutral ground potential. Protective diodes 120 and 122 across the two keyer output jacks 50 prevent damage to the output transistors of output circuit 48 should the wrong jack be selected for a particular transmitter. In this case the transmitter would then be keyed continuously.

Power switching network 30 allows keyer 10 to be turned on and off with a momentary switch, forces the keyer to be off when plugged in, and provides turn-off after a preset period of non-use. Transistor 124 is a series pass transistor between diode bridge 28 and the remaining portion of power switching network 30. Bridge 28 is comprised of diodes 126, 128, 130 and 132 and rectifies the AC input in providing a DC voltage to power switching network 30. NAND gates 134 and 136 form an R-S flip-flop which drives NAND gates 138 and 140 in parallel to turn transistor 124 off. When keyer 10 is plugged in, capacitor 142 will have been discharged through diode 144, holding the output of NAND gate 136 high. Both inputs to NAND gate 134 will therefore be high, causing the output of gate 134 to go low, and the outputs of gates 138 and 140 to go high. This maintains transistor 124 in an "off" state and thus ensures that keyer 10 is turned off. It is to be noted that the logic circuitry made up of gates 134, 136, 138 and 140 is connected to the output of rectifying bridge 28 at all times.

Figure 3:
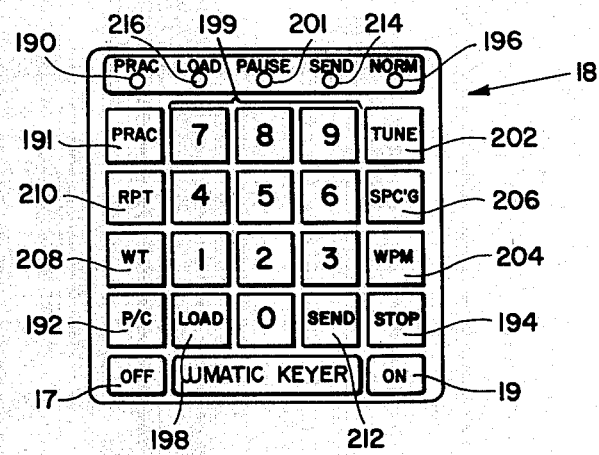
FIG. 3 shows the control keypad arrangement for the entry of command strings in the electronic code keyer of the present invention.

Pressing the ON button 19 on keypad 18 as shown in FIG. 3 takes one input of gate 134 low, causing its output to go high, and the outputs of gates 138 and 140 to go low. This causes transistor 124 to turn on and supplies power to keyer 10. At the same time transistor 146 is turned on causing capacitor 142 to be charged. At this point both inputs to gate 136 are high; its output is low, keeping the R-S flip-flop in this state when the ON button 19 on keypad 18 is released. However, transistor 146 is then turned off, allowing capacitor 142 to slowly discharge through resistor 148. If capacitor 142 is allowed to discharge far enough, it will eventually appear as a low on the input to gate 136, toggling the R-S flip-flop in turning off keyer 10. This will occur only if keyer 10 is not used for a predetermined period of time, as transistor 150 is connected to effectively "push" the ON button whenever the sidetone sounds, resetting the automatic shut-off interval.

Memory elements 22 are mutually coupled 256×4 CMOS RAMs connected as a 256×8 RAM. Each RAM 22 has a very low power standby mode which permits it to retain data with a supply voltage of as low as 2 volts. This standby mode is selected by causing the chip enable input CE2 to go low. To ensure that data is not lost when keyer 10 is turned off or loses power, memory back-up switching network 32 is provided which consists primarily of transistors 152 and 154 and associated components. Memory back-up switching network 32 senses when the supply voltage is about to drop below the minimum voltage required for voltage regulator IC's 156 and 158 to remain in regulation, and quickly pulls the CE2 chip enable signal to RAM 22 low.

As the collector of transistor 124 falls, capacitor 160 discharges quickly through diode 162. When this voltage reaches approximately 8 volts, transistor 154 turns off, as does transistor 152, allowing resistor 164 to pull the CE2 input to RAM 22 low. As the output of regulator IC 158 falls below the battery voltage, diode 166 becomes forward biased while diode 168 becomes reverse biased. Diode 170 makes up for the voltage drop across diode 168 when keyer 10 is on. RAM 22 is now in standby mode. The back up batteries 34 are only switched in when keyer 10 is disconnected from the source of power. Thus battery life may be extended by simply leaving keyer 10 plugged in when not in use. In the preferred embodiment of the present invention battery 34 is a 4.5 VDC source. When keyer 10 is turned on, capacitor 160 is charged through resistor 172 to provide a short delay before RAM 22 is enabled thus ensuring that all voltages have first been stabilized at their proper values prior to energizing RAM 22.

Whenever the status of keyer 10 is changed by means of keypad 18, the data on an internal status register in microprocessor 20 is latched into LED latch circuitry 24. This causes the appropriate LEDs 174 in LED display 26 to light. One of the status bits goes low when a digit key on keypad 18 is selected. This status bit causes transistor 176 to turn off when in the NORMAL mode, dimming the NORMAL LED 196 as a reminder that keyer 10 is expecting a function key to be presently selected. The electronic code keyer shown in FIG. 2 has been described in terms of the operation and functions performed by its major components. Various other components are shown in FIG. 2 which have not been discussed since their incorporation in such a circuit is conventional in nature in ensuring optimum operation of electronic code keyer 10. Shown in Table I are the preferred values of all components of electronic keyer 10 as illustrated in FIG. 2. Table II contains a list of all integrated circuits utilized in the preferred embodiment of the present invention and includes information regarding IC type, grounded pin connection, and input voltage pin connections for both AC operation and DC battery operation.

Selection of character information speed, character spacing, character weighting, message repeat count, buffer, and mode is made by means of a thin 20 position keypad 18 shown in FIG. 3. Audible feedback is provided by gating the sidetone to produce a "click". Illegal entries and error conditions produce a "warble". Integral capacitive "touch" paddles (not shown) provide reduced fatigue. The touch paddles unplug from keyer 10 and can be stored inside keyer 10 when not required. A rear-panel jack (not shown) provides for an external mechanical paddle assembly. Sidetone oscillator 36 and speaker 44 are built into keyer 10 and provide for variable pitch and volume control.

Five LEDs on the top of keypad 18 indicate the current state of electronic code keyer 10. The PRAC LED 190 indicates that keyer 10 is in the automatic code practice mode of operation which is available by pressing (n) (PRAC). n is a single or double digit number which establishes a "seed" for a random character generator. The single digit, or second digit of a double-digit entry, also selects the character types to be generated for practice, as follows:

n = 1-3: sends alpha characters (A-Z);

n = 4-6: sends alpha-numeric characters (A-Z, and 0-9);
n = 7-9: sends alpha-numeric characters plus . , ?/

TABLE I

| REFERENCE NO. | PREFERRED VALUE |
| --- | --- |
| 40 | 500 Kilohms |
| 54 | 10 Microfarads |
| 62 | .01 Microfarads |
| 64 | .02 Microfarads |
| 66 | 10 Kilohms |
| 68 | 18 Kilohms |
| 70 | 100 Kilohms |
| 71 | 10 Kilohms |
| 73 | 1 Kilohm |
| 75 | 3.3 Kilohms |
| 77 | 10 Kilohms |
| 79 | 10 Kilohms |
| 81 | 3.3 Kilohms |
| 82 | 10 Kilohms |
| 83 | 56 Picofarads |
| 84 | 10 Kilohms |
| 85 | 0.1 Microfarads |
| 87 | 56 Picofarads |
| 89 | 0.1 Microfarads |
| 91 | 10 Kilohms |
| 93 | 10 Kilohms |
| 95 | 10 Kilohms |
| 96 | 10 Microfarads |
| 97 | 10 Kilohms |
| 98 | 10 Microfarads |
| 99 | 10 Kilohms |
| 101 | 10 Kilohms |
| 103 | 1 Kilohm |
| 105 | 10 Kilohms |
| 107 | 100 Kilohms |
| 109 | 100 Kilohms |
| 111 | 10 Kilohms |
| 112 | 270 Ohms |
| 113 | 3.3 Kilohms |
| 114 | 270 Ohms |
| 115 | .001 Microfarads |
| 117 | .001 Microfarads |
| 119 | .001 Microfarads |
| 121 | 15 Ohms |
| 123 | 2.2 Microfarads |
| 142 | 220 Microfarads |
| 143 | 100 Kilohms |
| 145 | 10 Kilohms |
| 147 | .001 Microfarads |
| 148 | 10 Megohms |
| 149 | .001 Microfarads |
| 151 | 270 Ohms |
| 153 | 470 Microfarads |
| 155 | 2.2 Kilohms |
| 157 | 1 Kilohm |
| 159 | 10 Kilohms |
| 160 | 2.2 Microfarads |
| 161 | 10 Kilohms |
| 163 | 10 Kilohms |
| 164 | 10 Kilohms |
| 165 | 0.68 Microfarads |
| 167 | 0.1 Microfarads |
| 169 | 0.68 Microfarads |
| 177 | 270 Ohms |
| 179 | 270 Ohms |
| 181 | 1000 Ohms |
| 183 | 270 |

TABLE II

| INTEGRATED CIRCUIT | TYPE | GND | +5VDC (MAIN) | AUX. +5VDC or BATTERY |
| --- | --- | --- | --- | --- |
| Microprocessor 20 | 3870 | 20,21 | 40 | — |
| Ram 22 | 5101 | 8 | — | 22 |
| Regulator 156 | 7805 | — | — | — |
| Regulator 158 | 78L05 | — | — | — |
| NAND Gates 134, 136, 138, 140 | 4011 | 7 | — | — |
| LED Latch 24 | 74LS74 | 8 | 1,16 | — |
| Inverters 60, 178 | 4049 | 8 | 1 | — |

TABLE II-continued

| INTEGRATED CIRCUIT | TYPE | GND | +5VDC (MAIN) | AUX. +5VDC or BATTERY |
|---|---|---|---|---|
| 180, 184, 186, 188 OR Gates 52, 58, 74, 182 | 4071 | 7 | 14 | — |
| Flip-Flops 78 & 80 | 4013 | 6,7,8 | 14 | — | n = 0 : sends alpha-numeric characters plus . , ? /
— — — : ; ' " ( !

The practice mode of operation may be ended with the STOP key 194, and paused with the P/C key 192.

Buffers 0–9 are available for storage of text sent from the paddles, or for command strings consisting of keypad sequences to be described. Although the present invention will be described in terms of 10 available buffer memories, this is merely a consequence of using a single digit for buffer selection. All buffers are of variable strength, with the total buffer space holding a maximum of 240 characters and word spaces, or keystrokes in the case of a command buffer. The present invention is not limited to this particular buffer memory number as any size RAM could be utilized herein. When room for 20 or less characters remains in memory, the pitch of the sidetone drops noticeably as a warning. If buffer space is exhausted, the sidetone will warble, and the keyer 10 will return to the NORMAL mode of operation with the NORM LED 196 illuminated. To load a particular buffer memory, the user selects [n] which represents the desired buffer. The LOAD key 198 is then selected causing the buffer to be cleared and the keyer output disabled. The desired character string is then entered into the (n) buffer. After the last character has been entered, the stop key 194 is selected to terminate the message and return to the NORMAL mode.

Pressing the TUNE key 202 when the keyer is in the NORMAL mode of operation or when paused in the SEND or PRACTICE mode causes the transmitter to be keyed continuously. The TUNE function is stopped by pressing any key other than TUNE, in which case that key will also perform its normal function for the current mode, or by touching either paddle.

Pressing one or two digit keys, followed by selecting the WPM key 204 causes keyer speed to be set to that value. Character/word spacing is automatically set for the same value. If it is desired to have characters formed at one speed and sent at a lower speed this is accomplished by inserting longer than normal spaces between characters and words. This is accomplished by first selecting the character formation speed as previously described, and then selecting the spacing by pressing one or two digit keys, followed by the SPC'G key 206. The normal ratio of dot:dash:element space = 1:3:1 may be altered by pressing a single digit key followed by the WT key 208 which sets the timing as follows:

If n is not specified, i.e., WT is pressed with no preceding digit, the normal timing ratio as noted above is used;

If n is 0,1,2,3, or 4, the inter-element space is increased in length, and the dot and dash lengths are correspondingly decreased, resulting in a "lighter" weighting, with n=0 being the lightest; and If n is 5,6,7,8, or 9, the inter-element space is decreased in length, and the dot and dash lengths are correspondingly increased, resulting in a "heavier" weighting, with n=9 being the heaviest.

A message buffer may be automatically caused to repeat up to 9 times (sent up to 10 times) by first setting the desired repeat count by selecting the desired digit key (n). The RPT key 210 is then selected which sets the repeat count to (n). Any message buffer sent will then automatically repeat n times. The repeat count will remain set to this value until set to another number, or reset to 0 by the sequence 0RPT, or simply RPT. A message buffer is sent by selecting one of the digit keys (n) 199 followed by selection of the SEND key 212, where n is the number of the desired message. This causes the SEND LED 214 to be illuminated. If n is not specified, buffer 0 is assumed. The message may be stopped by one of the following conditions:

The message completes after being sent the number of times specified by the repeat count, with the keyer returning to NORMAL mode;

The message encounters a PAUSE in the message text, such that text may now be inserted using the paddles as described earlier. Pressing the P/C key 192 causes the message to continue from where it left off;

The P/C key 192 is pressed and the keyer will not pause until the current character has completed; or The STOP key 194 is pressed.

Any of the 10 buffers may be used to designate a sequence of messages to be sent and may, in addition, control speed, spacing, weight and repeat count. This feature makes the present invention especially versatile. For example, assume buffer #0, #1, #2, #3, and #4 hold the following contents:

0: [2] [0] [WPM] [2] [RPT] [1] [SEND] [RPT] [2] [SEND] [2] [RPT] [4] [SPC'G] [3] [SEND] [RPT] [SPC'G] [3] [0] [WPM] [4] [SEND] p0 #1: <call letters of other station>
2: DE
3: K8TP
4: IN MICHIGAN < ... > < ... > K Simply loading the call of the station into buffer #1 and pressing SEND key 212 causes that call to be sent 3 times, followed by "DE", then "K8TP" sent 3 times, all at 20 words per minute, followed by the contents of buffer #4, sent once at 30 words per minute, with an extended space before the "K". Keyer 10 will then return to NORMAL mode with all parameters set as they were originally. To load a command string into a buffer memory, the procedure is identical to loading a message except that if a keypad button is pressed after pressing (n) (LOAD), the paddles become inactive, and keyer 10 is in the LOAD COMMAND mode of operation with the LOAD LED 216 illuminated. After the last entry is made, a return to the NORMAL mode is accomplished by selection of STOP key 194. As in loading text, the pitch of the keypad click will drop when memory space for 20 commands or less remains. The sidetone will warble and keyer 10 will return to the NORMAL mode of operation if the last key pressed filled buffer space. Shown in Table III are the pin connections of FIG. 2 accomplished by selection of the various keys shown on the keypad 18 of FIG. 3. Table IV includes a summary of operations of the five status LEDs shown in FIG. 3 and previously discussed. Table V includes a summary of commands initiated by selection of the various keys of keypad 18 as previously discussed.

TABLE III

| KEYBOARD MATRIX | |
|---|---|
| KEY | PINS |
| OFF | 9,14 |
| ON | 9,13 |

| | |
|---|---|
| TUNE | 1,9 |
| STOP | 2,6 |
| P/C | 6,11 |
| LOAD | 6,10 |
| SEND | 3,6 |
| WPM | 2,7 |
| SPC'G | 3,7 |
| WT | 7,11 |
| RPT | 7,12 |
| PRAC | 6,12 |
| 0 | 5,8 |
| 1 | 8,11 |
| 2 | 4,8 |
| 3 | 2,8 |
| 4 | 8,12 |
| 5 | 8,10 |
| 6 | 3,8 |
| 7 | 7,10 |
| 8 | 5,7 |
| 9 | 4,7 |

TABLE IV

| PRAC | LOAD | PAUSE | SEND | NORM | |
|---|---|---|---|---|---|
| | | | | ON | Normal (Power-up) mode |
| | | | | (dim) | Normal mode, digit(s) pressed |
| | ON | | | | In 'load test' or 'load command' mode |
| | | | ON | | Sending a message buffer |
| | ON | ON | | | Paused while sending a message buffer |
| | | ON | | | Paused from a command string |
| ON | | | | | Sending code practice |
| ON | | ON | | | Paused while sending code practice |

TABLE V

| SUMMARY OF COMMANDS | | |
|---|---|---|
| (1) | [ON] | Turn keyer on |
| (2) | [OFF] | Turn keyer off |
| (3) | [n][LOAD] <text> [STOP] | Clear buffer n and load with <text> |
| (4) | [n][LOAD] <cmd string> [STOP] | Load buffer n with <command string> |
| (5) | [n][SEND] | Send message n / execute command string n |
| (6) | [SEND] | Send message o / execute command string o |
| (7) | [n][RPT] | Set repeat count to n |
| (8) | [RPT] | Set repeat count to zero |
| (9) | [n][PRAC] | Send code practice |
| (10) | [n][WPM] | Set char. formation speed & spacing to n |
| (11) | [n][SPC'G] | Set spacing to n |
| (12) | [SPC'G] | Set spacing = formation speed |
| (13) | [n][WT] | Set weighting to n |
| (14) | [WT] | Set normal weighting |
| (15) | [TUNE] | Latch output until other key or paddle |
| (16) | [P/C] | Pause / Continue sending |
| (17) | [STOP] | End current function |
| (18) | [P/C][STOP] | RESET keyer (keys pressed simultaneously) |
| (19) | [LOAD][SEND] | Invert paddles (keys pressed simultaneously |

Figure 4:
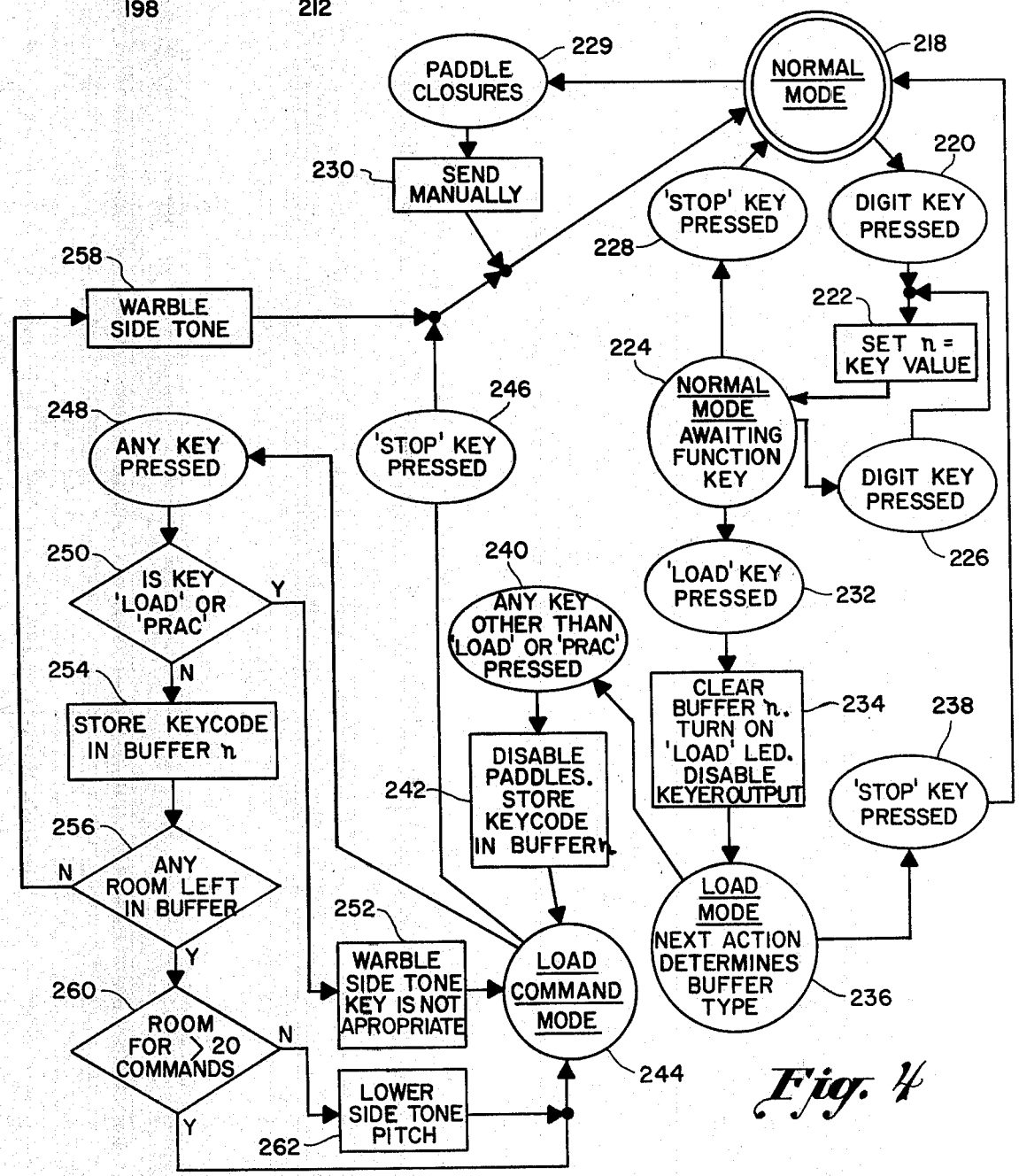
FIG. 4 shows the sequence of operations in the microprocessor in providing control for the electronic code keyer during the command, or instruction, loading mode of operation.
Figure 5A:
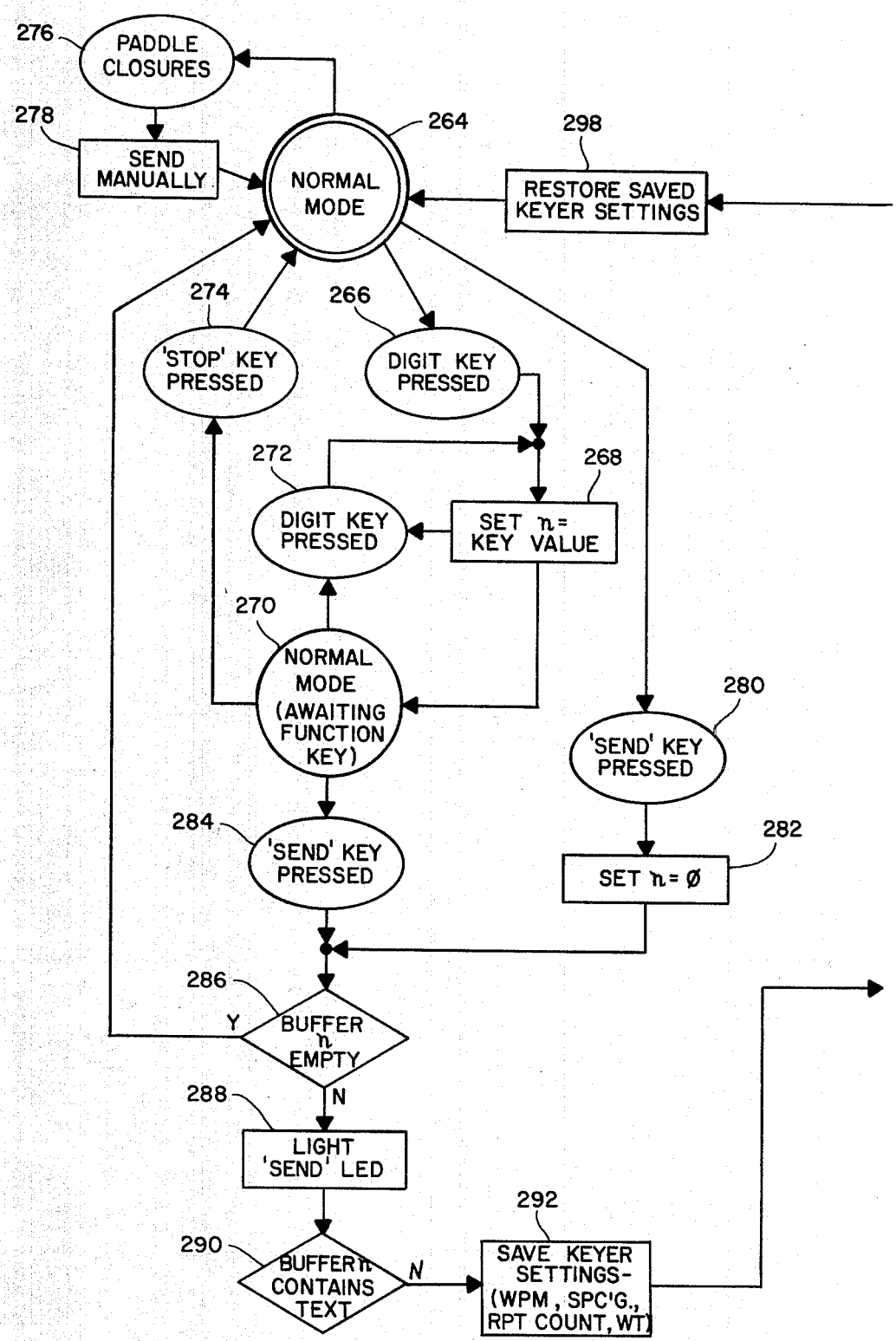
FIGS. 5A and 5B show the sequence of operations in the microprocessor in controlling the electronic code keyer during the message transmission mode of operation.
Figure 5B:
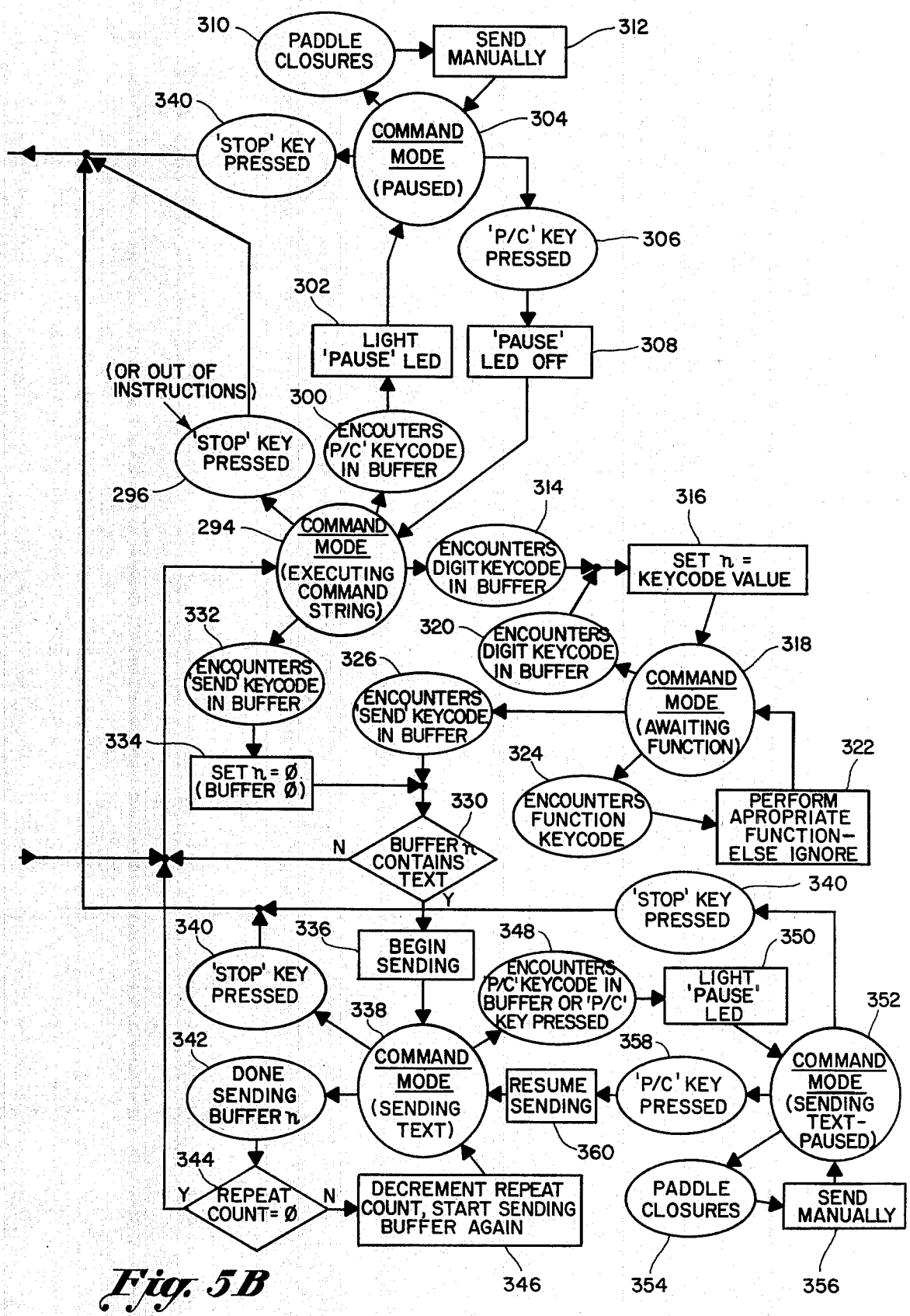

FIG. 4 shows the steps involved in the loading of a command string in a buffer memory of RAM 22. In FIGS. 4 and 5A and 5B a circle designates a state of electronic code keyer 10, an elliptical symbol indicates an action or condition for action by keyer 10, a diamond symbol indicates a decision point in the program routine, and a rectangle represents the effect or resulting state following a decision. The flow diagrams shown in FIGS. 4 and 5A and 5B represent the program stored in the ROM of microprocessor 20 which receives the input signals from keypad 18 and touch paddles 12 or 14, processes these signals, and performs functions in providing appropriate instructions and data to RAM 22 and to output circuitry 48. The program initially determines that keyer 10 is in the NORMAL mode 218 and then detects whether a digit key has been pressed 220 and, if so, which digit key 222. If a digit key has been selected, the program proceeds to a mode wherein it awaits the selection of a function key 224. If another digit key is selected at this point, the program returns to the digit number detection mode 226, replacing the previously selected digit, eventually returning to the await function key step 224. If the "STOP" key 194 is selected 228 following selection of a digit key but prior to the selection of another function key, the program returns to the NORMAL mode detection status 218 and prepares for the detection of paddle closure 229 for the manual sending of character strings 230. If a function key other than "STOP" is selected following the selection of digit key 224 the program then detects the selection of the "LOAD" key 232 and clears the buffer corresponding to the selected digit, turns on the LOAD LED 216, and disables the keyer output 234. The program next proceeds to a command, or instruction, LOAD mode 236 and looks 240 for the selection of any key other than the "LOAD" 198 or "PRAC" key 191. If any key other than these two has been selected the program disables the input paddles and stores the key coded input in buffer n of RAM 22. If in the LOAD mode of operation the "STOP" key 194 is selected the program 246 returns to the NORMAL mode monitoring state 218.

If a key other than "LOAD" or "PRAC" has been selected, following the disabling of the paddles and the storing of the key coded instruction in buffer n, the program proceeds to a LOAD command mode 244 where it detects the selection of any key 248. If any key other than the STOP key 194 has been detected at step 248 the program then looks to see whether the "LOAD" of "PRAC" key has been selected 250. If either of these keys has been selected the program initiates a warbling of the sidetone to indicate that the selected key is inappropriate, and returns to the LOAD COMMAND mode 244 and awaits the proper key entry for command instruction loading. During this step the program takes no action with respect to pitch change since the storage capacity of the n buffer has not been changed. If at step 250 the program detects neither the selection of the "LOAD" key 198 or the "PRAC" key 191 the program at 254 then stores the coded command in buffer n of RAM 22. Following the storage of this coded command, the program then monitors the status of the buffer in which the command is loaded 256 to detect when the memory capacity of buffer n has been exceeded. If buffer n's capacity has been exceeded the program then causes the sidetone oscillator to warble 258 in providing an aural indication that buffer capacity has been exceeded. If the program detects that there is still available capacity in buffer n, it then senses when the available capacity in buffer n is insufficient to accomodate more than 20 characters 260. If buffer memory n is still capable of accomodating more than 20 command characters, the program then proceeds to a LOAD COMMAND mode 244 to await further command inputs to buffer n. If at step 260 the program detects that there is insufficient memory capacity in buffer n to accomodate more than 20 command characters it lowers the sidetone pitch 262 to provide the operator with an aural indication that the limit of memory storage capacity is being approached. The program then proceeds to the LOAD COMMAND mode 244.

The SEND mode of operation of keyer 10 as executed by the contents of the ROM of microprocessor 20 shown in FIG. 5A and 5B. The program initially determines whether keyer 10 is in the NORMAL mode of operation 264 and then determines whether a digit key has been pressed 266. If selection of a digit key is detected 268, the program proceeds to the NORMAL mode of operation 270 where it awaits the selection of a function key on keypad 18. If another digit key is selected 272 at this point, the program replaces the previously selected digit key with the later selected digit key. Following the selection of a digit key and prior to the selection of a function key if the "STOP" key 194 is selected 274, the program proceeds back to the NORMAL mode of operation 264. At this time the program monitors paddle closure 276 and prepares to manually send text 278. If the SEND key is selected 284 following digit key selection, the program then detects whether or not information is stored in buffer n 286. If data is stored in buffer n, the program proceeds to the NORMAL mode of operation 264 and begins the previously discussed operation anew. If the program detects that buffer n is not empty 286, the SEND LED 214 is lighted 288 and a determination is made whether or not buffer n contains text 290. If it is determined that buffer n does not contain text the program retains the most recent keyer settings in memory 292 and proceeds to the command mode 294 in preparation of executing the buffer stored command string. If at this point the "STOP" key 194 is selected the program restores the saved keyer settings 298 and proceeds to the NORMAL mode of operation 264. In the NORMAL mode of operation 264 if the SEND key 212 is selected prior to the selection of a digit key the "SEND" 212, the program sets n equal to zero (default) 282. It then proceeds to a determination of whether buffer 0 is empty or not 286.

Following entry of the program into the COMMAND mode of operation 294 if the program detects a P/C key code in buffer n 300 the PAUSE LED 201 is illuminated 302 and the program proceeds to the PAUSED COMMAND mode of operation 304. If paddle closures are then detected 310 a message is manually transmitted 312. If the "STOP" key 194 is selected at this time, the program restores the saved keyer settings 298 and proceeds to the NORMAL mode of operation 264. If in the PAUSED COMMAND mode of operation 304 the "P/C" key 192 is selected 306, the PAUSE LED 201 is turned off 308 and the COMMAND mode of operation 294 is returned to.

If a digit key code is detected in the command buffer 314 the program sets n equal to the key code value 316 and proceeds to the COMMAND mode of operation and reads the next instruction from the command buffer 318. If a function key code is encountered in the command buffer 324, the program performs the appropriate function 322 and returns to the "COMMAND MODE AWAITING FUNCTION" mode 318. If the program encounters a digit key code in the command buffer 320 the program again sets n equal to the key code value 316 and returns to the "COMMAND MODE AWAITING FUNCTION" mode of operation 318. If in the "COMMAND MODE AWAITING FUNCTION" mode the program detects a "SEND" key code in the command buffer n 326 the program determines whether or not command buffer n contains text 330. If it is determined that buffer n does not contain text the program returns to the "COMMAND MODE EXECUTING COMMAND STRING" mode 294 where, if it encounters a SEND key code in buffer n 332, it sets n=0 334 and determines whether or not buffer zero contains text 330. If it is determined that buffer zero does contain text the program begins sending that text 336 and enters the "COMMAND MODE TEXT SENDING" state 338. If during the COMMAND mode sending text state the STOP key 194 is selected 340 the program restores the last keyer settings and proceeds to the NORMAL mode of operation 264. When the contents of buffer n have been transmitted 342 the program checks the repeat count 344. If the repeat count is not 0, it is decremented and the text in buffer n is started again 346. The keyer then returns to the "COMMAND MODE TEXT SENDING" mode 338. If the repeat count is 0, the keyer returns to the "COMMAND MODE EXECUTING STRING" mode 294 and reads the next command in the command buffer. Instructions in the command buffer are thus sequentially executed, setting keyer parameters and/or sending the contents of text buffers, until no more instructions in the command buffer remain to be executed 296, at which point the save keyer settings are restored 298 and normal mode 264 is entered. If the program detects a P/C key code in buffer memory or the P/C key 192 has been selected, the "PAUSE" LED 201 is illuminated 350 and a "SENDING TEXT-PAUSED COMMAND" mode 352 is entered. If the STOP key 194 is then selected the program then proceeds to the NORMAL mode of operation 264. If paddle closures are then detected 354, a message is transmitted manually 356. If the P/C key is selected 358 the keyer resumes sending the message 360 and then proceeds to the "SENDING TEXT COMMAND" mode of operation 338.

There has thus been shown an electronic code keyer controlled by a microprocessor in which command buffers are utilized for automatically controlling keyer operating modes in the automatic transmission of stored text information.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An electronic code keyer for automatically generating an ordered arrangement of characters from a first and second sequence of coded signals wherein a plurality of keyer operating parameters may be varied over a wide range of values, said electronic code keyer comprising:
   input means for generating said first sequence of coded signals;
   control means for generating said second sequence of coded signals;
   processor means coupled to said input means and to said control means and responsive to said first sequence of coded signals for generating said ordered arrangement of characters and responsive to said second sequence of coded signals for generating a plurality of instructions for operating said keyer over said wide range of operating parameters;
   random access memory means coupled to said processor means, said random access memory means having a plurality of addressable memory locations for the storage and read out of said ordered arrangement of characters and said instructions, the read out of said ordered arrangement of characters being determined by said instructions; and
   output means coupled to said processor means for receiving said ordered arrangement of characters in accordance with said instructions and for transmitting said characters over a wide range of keyer operating parameters in accordance with said instructions.

2. An electronic code keyer in accordance with claim 1 wherein the plurality of keyer operating parameters include the rate at which words comprised of said characters are transmitted, inter-character spacing, inter-word spacing, and individual transmitted signal duration.

3. An electronic code keyer in accordance with claim 1 wherein said plurality of addressable memory locations in said random access memory means are accessed in accordance with said second sequence of coded signals.

4. An electronic code keyer in accordance with claim 1 further including means for providing an audio indication when the number of unused memory locations in said random access memory means for the storage of said ordered arrangement of characters and said instructions is equal to a predetermined number.

5. An electronic code keyer in accordance with claim 1 further including visual display coupled to said processor means for receiving instructions in providing a visual indication of the mode of operation of said keyer.

6. An electronic code keyer in accordance with claim 5 wherein said visual display means comprises a plurality of light emitting diodes, each light emitting diode representing a particular mode of operation of said keyer.

7. An electronic code keyer in accordance with claim 1 wherein said input means comprises a paddle arrangement for generating said first sequence of coded signals.

8. An electronic code keyer in accordance with claim 7 wherein said control means comprises a keypad arrangement including a plurality of selectable keys for generating said second sequence of coded signals.

9. An electronic code keyer in accordance with claim 1 wherein said second sequence of coded signals includes a pause instruction whereby the transmission of said ordered arrangement of characters may be automatically interrupted for the manual insertion of additional characters followed by the continued automatic transmission of said ordered arrangement of characters.

10. An electronic code keyer for automatically generating an ordered arrangement of characters from a first and second sequence of coded signals wherein a plurality of keyer operating parameters including the rate at which words comprised of said characters are transmitted, inter-character spacing, inter-word spacing, and individual transmitted signal duration may be varied over a wide range of values, said electronic code keyer comprising:
   input means including a paddle arrangement for generating said first sequence of coded signals;
   control means comprising a keypad arrangement including a plurality of selectable keys for generating said second sequence of coded signals;
   processor means coupled to said input means and to said control means and responsive to said first sequence of coded signals for generating said ordered arrangement of characters and responsive to said second sequence of coded signals for generating a plurality of instructions for operating said keyer over said wide range of operating parameters;
   random access memory means coupled to said processor means, said random access memory means having a plurality of addressable memory locations for the storage and read out of said ordered arrangement of characters and said instructions, the read out of said ordered arrangement of characters being determined by said instructions; and
   output means coupled to said processor means for receiving said ordered arrangement of characters in accordance with said instructions and for transmitting said characters over a wide range of keyer operating parameters in accordance with said instructions.

11. An electronic code keyer for automatically generating an ordered arrangement of characters from a first and second sequence of coded signals wherein a plurality of keyer operating parameters including the rate at which words comprised of said characters are transmitted, inter-character spacing, inter-word spacing, and individual transmitted signal duration may be varied over a wide range of values, said electronic code keyer comprising:

input means including a paddle arrangement for generating said first sequence of coded signals;

control means comprising a keypad arrangement including a plurality of selectable keys for generating said second sequence of coded signals;

processor means coupled to said input means and to said control means and responsive to said first sequence of coded signals for generating said ordered arrangement of characters and responsive to said second sequence of coded signals for generating a plurality of instructions for operating said keyer over said wide range of operating parameters;

random access memory means coupled to said processor means, said random access memory means having a plurality of addressable memory locations for the storage and read out of said ordered arrangement of characters and said instructions in accordance with said instructions;

output means coupled to said processor means for receiving said ordered arrangement of characters in accordance with said instructions and for transmitting said characters over a wide range of keyer operating parameters in accordance with said instructions;

audio signal generating means coupled to said processor means for providing an audio indication when the number of unused memory locations in said random access memory means for the storage of said ordered arrangement of characters and said instructions is equal to a predetermined number; and visual display means coupled to said processor means for receiving instructions in providing a visual indication of the mode of operation of said keyer.

* * * * *

UNITED STATES PATENT OFFICE
CERTIFICATE OF CORRECTION

Patent No. 4,333,091　　　　　　　Dated　June 1, 1982

Inventor(s)　Terry A. Perdue

It is certified that error appears in the above-identified patent and that said Letters Patent are hereby corrected as shown below:

Change the identified assignee from "Zenith Radio Corporation" to -- Heath Company -- .

Signed and Sealed this

Seventh Day of September 1982

[SEAL]

*Attest:*

*Attesting Officer*

GERALD J. MOSSINGHOFF

*Commissioner of Patents and Trademarks*